United States Patent [19]

Okey et al.

[11] Patent Number: 5,733,456
[45] Date of Patent: Mar. 31, 1998

[54] ENVIRONMENTAL CONTROL FOR BIOLOGICAL NUTRIENT REMOVAL IN WATER/WASTEWATER TREATMENT

[76] Inventors: Robert W. Okey, 13372 S. Ranchero Dr., Draper, Utah 84020; Mary C. Martis, 415 E. 1st Ave., Apt. 4, Salt Lake City, Utah 84103

[21] Appl. No.: 829,155

[22] Filed: Mar. 31, 1997

[51] Int. Cl.⁶ .................................................. C02F 3/30
[52] U.S. Cl. .......................... 210/605; 210/614; 210/622; 210/903; 210/906; 210/96.1; 210/195.1; 210/202; 210/252
[58] Field of Search ................................. 210/96.1, 143, 210/195.1, 199, 202, 209, 252, 605, 610, 614, 622, 626, 630, 903, 906

[56] References Cited

U.S. PATENT DOCUMENTS

| | | | |
|---|---|---|---|
| 3,768,200 | 10/1973 | Klock | 210/903 |
| 4,173,531 | 11/1979 | Matsch et al. | 210/903 |
| 4,687,574 | 8/1987 | Hellman | 210/199 |
| 4,797,212 | 1/1989 | von Nordenskjold | 210/614 |
| 4,874,519 | 10/1989 | Williamson | 210/605 |
| 5,076,928 | 12/1991 | Ballnus | 210/605 |
| 5,268,092 | 12/1993 | Eden | 210/96.1 |
| 5,302,298 | 4/1994 | Leitzke | 210/195.1 |
| 5,407,578 | 4/1995 | Nathwani | 210/626 |
| 5,518,618 | 5/1996 | Mulder et al. | 210/605 |
| 5,545,326 | 8/1996 | Petering | 210/605 |

*Primary Examiner*—Thomas G. Wyse
*Attorney, Agent, or Firm*—Kokjer, Kircher, Bowman & Johnson

[57] ABSTRACT

Control of a water/wastewater treatment system is effected by sensing the oxidation reduction potential (ORP) at various parts of the system and using neuro-adaptive process control techniques to make adjustments when necessary based on the ORP values. Internal nitrate recycling, sludge return, organic substrate addition and/or aeration can be adjusted to achieve the desired environmental conditions. In the event that phosphorus removal is necessary, the system can be used to assure proper detention time needed for biological phosphorus uptake.

20 Claims, 2 Drawing Sheets

ENVIRONMENTAL CONTROL FOR BIOLOGICAL NUTRIENT REMOVAL IN WATER/WASTEWATER TREATMENT

FIELD OF THE INVENTION

The present invention relates in general to the treatment of water/wastewater and more particularly to controlling the treatment environment by monitoring the oxidation reduction potential.

BACKGROUND OF THE INVENTION

In the treatment of water and particularly wastewater, nitrification and denitrification are often required, and phosphorus removal is also frequently carried out. These processes typically involve treatment basins, or parts of treatment basins, that are oxic, anoxic or anaerobic. In the nitrification process, nitrogen from ammonia is converted to nitrate under conditions of aerobic (oxic) metabolism where molecular oxygen is present to promote nitrate conversion. Denitrification is carried out in an anaerobic or anoxic environment where the nitrate nitrogen is converted to nitrogen gas. Biological phosphorus removal normally entails holding the wastewater and sludge in an anaerobic environment long enough that the phosphorus is released from the sludge microorganisms. The luxury uptake of phosphorus takes place in an oxic environment.

In the past, difficulty has been encountered in controlling the treatment system in a manner to achieve efficient and effective treatment. The wastewater influent characteristics can vary dramatically, such as when there is a sudden large industrial load or another shock load added. Consequently, it is necessary for the system to be able to respond quickly to the changed conditions so that there will be no drop off in the effectiveness of the treatment even in the face of sudden changes in the character of the influent. The techniques that have been used in the past for system control have not always been able to maintain the treatment system in the proper state, such as with proper nitrate levels, to assure adequate treatment of the water or wastewater at all times, particularly when the system is subjected to a sudden change in loading.

SUMMARY OF THE INVENTION

The present invention makes use of novel techniques to reliably control the environments in which biological nutrient removal is effected in water/wastewater treatment. In accordance with the invention, the oxidation potential, commonly referred to in the industry as oxidation reduction potential (ORP), is monitored at various selected stages of the treatment process. The information provided by the ORP levels is used, with neuro-adaptive process control techniques, to adjust the treatment system in a manner to assure that the treatment process is carried out as intended. In particular, the control system can make various adjustments, alone or in combination with other adjustments, including adjustment of internal nitrate recycle rates and/or inlet locations, adjustment of return activated sludge rates and/or inlet locations, adjustment of the amount of supplementary organic substrate added, adjustment of the degree of aeration and/or reaeration, control of the rate and extent of denitrification in the anoxic portion or portions of the process, and control of the extent of anaerobiosis necessary for producing an environment suitable for the uptake of phosphorus by microorganisms that are present and cultivated for that purpose.

The invention makes use of a biological reactor at the head of the system which receives the influent and which is either anaerobic or anoxic, depending upon whether or not there are phosphorus removal requirements. An oxic reactor converts the organics in the influent to carbon dioxide and water and converts ammonia nitrogen to nitrate. Part of the nitrate is recycled to the first reactor and part of it is delivered to an anoxic reactor which uses the residual nitrate. The liquid may be subjected to reaeration in another reactor before undergoing final clarification.

The invention is characterized by the use of ORP probes to monitor the ORP in order to sense the system oxidation state and its rate of change with time. By sensing the slope (rate of change with time) of the ORP, the control system can respond appropriately if there is an excess of nitrate, a shortage of nitrate, or a shock load or another imbalance, because there is then an abrupt change in the slope to indicate system operation out of the intended range of operation. The response can be a change in the internal nitrate recycling, a change in the rate of return activated sludge, an adjustment of the amount of added auxiliary substrate such as methanol, or another adjustment appropriate to return the system to the intended operating conditions.

Data acquired from other installations are used to establish an informational baseline for the system parameters. Software using neuro-adaptive techniques in a neural-network tracks slowly time varying characteristics of the plant. The neuro-adaptive control technique is important from a speed standpoint and also from the standpoint of maximizing the probability of correct actions at the correct times.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
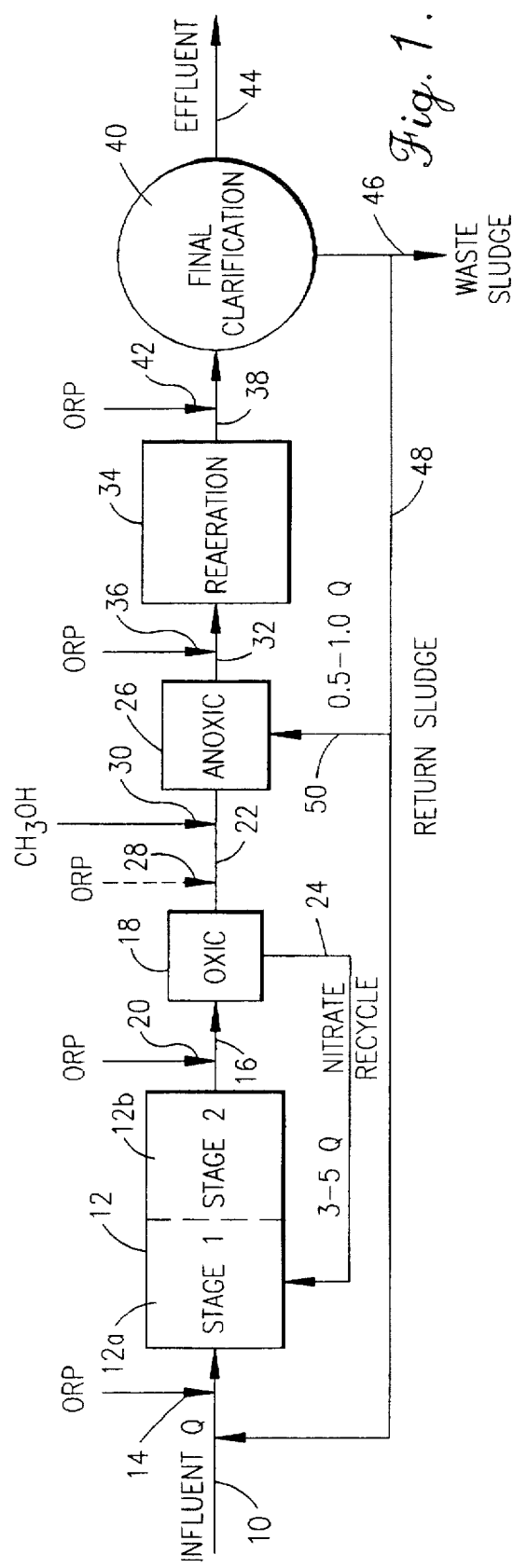
FIG. 1 is a diagrammatic view of a water/wastewater treatment installation controlled in accordance with the present invention.

Referring now to the drawings in more detail and initially to FIG. 1, influent water/wastewater is delivered to an inlet line 10 leading to a two stage biological reactor 12 having a first stage 12a and a second stage 12b. The oxidation state of the inlet line 10 is sensed by an oxidation potential probe 14. The oxidation potential is commonly referred to in the industry as the oxidation reduction potential or ORP. The ORP probe 14 and the other ORP probes used in carrying out the invention may be commercially available units having platinum sensing tips and a silver-silver chloride reference system. The sensory output from each ORP probe is in millivolts. The value is a measure of the ability of the system to exchange elections with the probe.

Reactor 12 is located at the head of the treatment system and is an anoxic/anaerobic or anaerobic/anoxic reactor. The reactor 12 may be subdivided into as many as four compartments or sub-reactors. In the system shown, there are two sub-reactors 12a and 12b. The system may be operated in a mode to biologically remove phosphorus, and both stages 12a and 12b are then used as a fermentation basin maintained in an anaerobic state. The stages of reactor 12 have a high food to microorganism gradient in order to encourage bio-selection. If there is no need for phosphorus removal, the system operates in a different mode in which both stages 12a and 12b are maintained in an anoxic state. Under conditions of anoxic metabolism, oxygen derived from nitrate is used as a final hydrogen acceptor. Anaerobic metabolism involves fermentation processes in which the conversions are limited to substrate level processes or, in cases such as the production of methane, processes in which the oxygen of carbon dioxide may be used as the final hydrogen acceptor.

Reactor 12 operates as a denitrification reactor in which nitrates are converted to nitrogen gas. In the phosphorus removal mode of operation, the first stage 12a performs the denitrification function. Stage 12b is used for the release of phosphorus as $PO_4$ from the microbial cells. The detention time in stage 12b is selected and controlled in a manner consistent with that function.

The first reactor 12 has a discharge line 16 that forms the inlet to a second biological reactor 18. An ORP probe 20 senses the ORP at line 16. Reactor 18 is an aerated and mixed reactor which will usually be maintained in an oxic state. It is used for nitrification to convert ammonia nitrogen ($NH_4N$) to nitrate, and to convert organic matter to carbon dioxide and water. Aerobic metabolism (also referred to as oxic metabolism) is the condition in which atmospheric oxygen is used as a final hydrogen acceptor.

Reactor 18 has a discharge line 22 through which part of its effluent is discharged. A nitrate return or recycle line 24 leads from reactor 18 back to the first stage 12a of reactor 12 to recycle the remaining discharge from reactor 18. The relative amounts delivered through lines 22 and 24 can be adjusted as desired by suitably adjusting valves or pumps (not shown) for these lines.

Line 22 is the inlet line for a third reactor 26 which is an anoxic reactor used for residual denitrification. An ORP probe 28 senses the ORP at line 22. An auxiliary substrate such as methanol is added at 30 to reactor 26, with the amount being controlled by the ORP levels. Methanol addition is used in systems that are BOD limited because denitrification ceases in such systems in the absence of a carbon source. Substrates other than methanol can be used, including primary or intermediate clarifier underflow, for example.

Reactor 26 has a discharge line 32 which forms the inlet line of a reaeration basin 34. An ORP probe 36 senses the ORP at line 32. The water/wastewater can be aerated in basin 34 if required. If reaeration is not necessary, the volume of basin 34 may be used as additional anoxic capacity. A discharge line 38 from basin 34 forms the inlet line to a clarifier 40 in which final clarification takes place. Line 38 is equipped with an ORP probe 42 to control reaeration. The clarified effluent is discharged from the clarifier through line 44. Waste sludge is removed via line 46.

Activated sludge is returned to the head of the system on a return line 48 which extends from the clarifier to the influent line 10. Some of the activated sludge returned to the system can be directed to reactor 26 on line 50.

The ORP values sensed by the ORP probes at various stages of the treatment process are used to control the system in a manner to achieve the intended results. The control system is preferably one using neuro-adaptive control techniques to effect any combination of the following adjustments that are necessary: (1) adjustment of the internal rate of nitrate recycling through line 24; (2) adjustment of the return activated sludge rates on line 48 and/or line 50; (3) adjustment of the substrate addition rate on line 30; (4) the amount of aeration in reactor 18 and/or the reaeration basin 34; (5) control of the rate and extent of denitrification in the anoxic reactors; and/or (6) control of the extent of anaerobiosis necessary for producing an environment suitable for the release of phosphorus by the microorganism that are present and cultivated by bio-selection.

Figure 2:
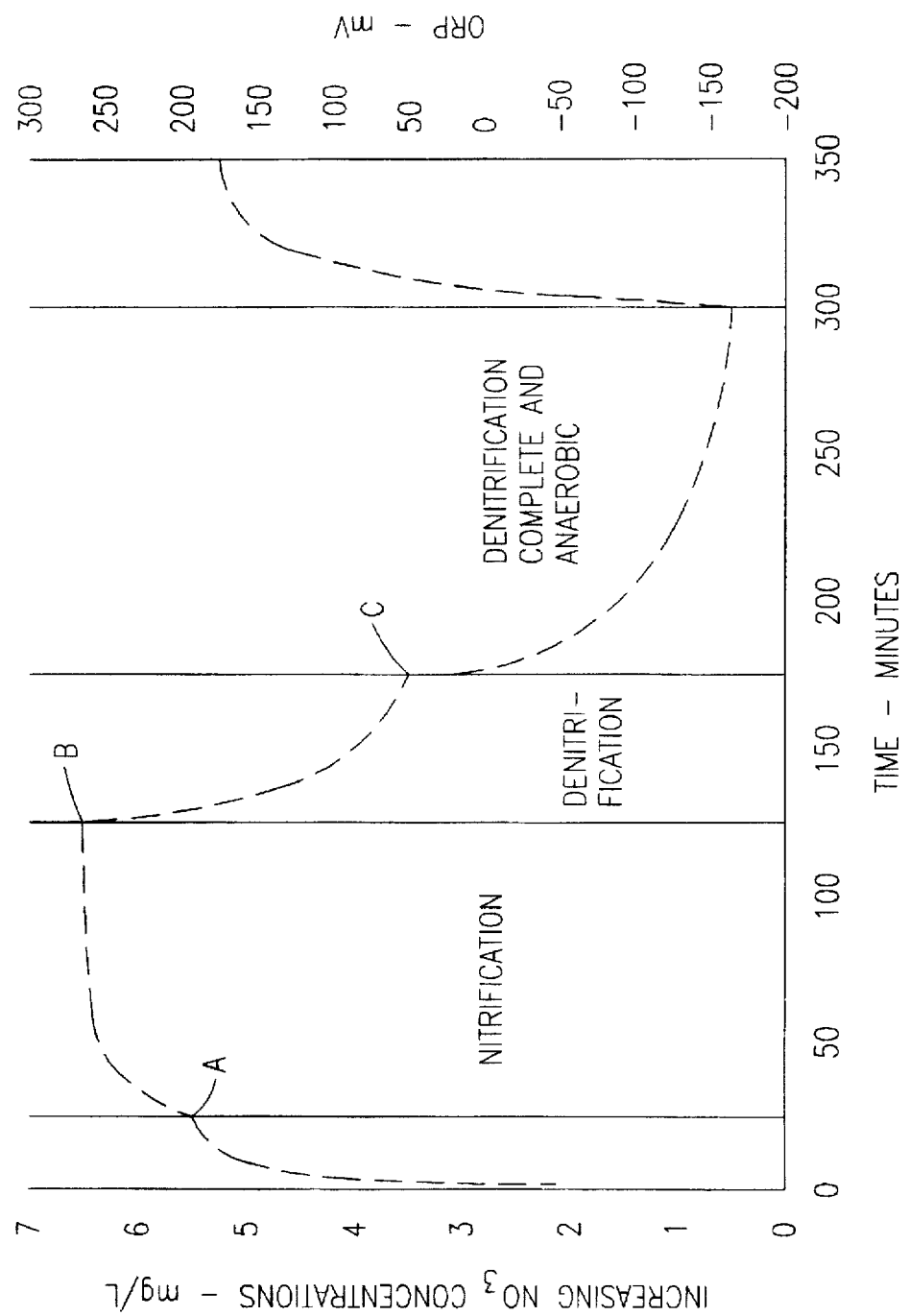
FIG. 2 is a graph of the nitrate concentration and ORP versus time in an exemplary plant operated according to the present invention.

It is contemplated that the control system will initially be "crudely trained" with operating ranges taken from literature and prior research, and data from existing plants. By way of example, FIG. 2 is a graph which illustrates one possible operating scenario. The system becomes oxic at point A where there is an abrupt change in the slope of the curve representing ORP plotted against time, representing a point of inflection indicating oxic conditions. The slope changes but not dramatically during nitrification between points A and B. At point B, there is another point of inflection indicated by an abrupt change in the slope of the curve. The system is then anoxic and carries out denitrification between points B and C. At point C, there is another inflection point at which the system becomes anaerobic.

If phosphorus removal is not necessary, stages 12a and 12b of reactor 12 can both be maintained anoxic with high F/M to provide bio-selection against filamentous bulking microorganisms. So long as the ORP probes 14 and 20 sense no abrupt changes in the curve slope, the system is operating in reactor 12 within the limits preestablished by the points of inflection B and C. The system is then operating in a stable condition with the anoxic environment in reactor 12 indicative of 0.5 ppm of dissolved oxygen or less. At the inflection point B, there is excessive nitrate in the system and the recycling of nitrate on line 24 is reduced or stopped entirely. Conversely, as the slope decreases toward point C, the nitrate content is lacking, and the nitrate amount recycled through line 24 is increased.

Thus, the control system can maintain the desired system environment by monitoring the rate of change of the ORP with time. The slope of the curve remains relatively stable in specific environments (i.e., those intended for nitrification or denitrification) but changes suddenly if there is a change in the environment. Thus, by sensing inflection points, the control system can adjust the recycle rate or make other adjustments to establish the intended environment or generate an alarm warning of a large industrial load.

In addition, the ORP probes monitor the absolute ORP values and can use them for control purposes at times. For example, a large instantaneous drop in the ORP value occurs in the instance of anaerobiosis (when the nitrate content has been depleted after the microorganisms had been using it as an oxygen source). This sudden change in the absolute ORP value can override the curve slope control when there is such a small change in the time increment. The absolute ORP value is thus significant in the case of phosphorus removal.

When there is a need for phosphorus removal as well as nitrogen removal, the first stage 12a of reactor 12 operates between points B and C for denitrification. The second stage 12b is anaerobic and the ORP is below the value at point C. The detention time in stage 12b is established as part of the plant design and can be controlled by the flow rate, the recycle of sludge in line 48 and flow of nitrate through line 24 (controlled by the $NO_3$ load), and the phosphorus limits. Anaerobiosis "selects" kinetically for microorganisms that are more prone to luxury uptake of phosphorus (in the oxic environment) and its release (in the anaerobic environment). A high F/M gradient in stages 12a and 12b is used to encourage bio-selection. Return activated sludge rates and the internal nitrate recycle rate, under the control of the ORP values, maintain the desired F/M ratio.

The reaeration basin 34 allows for reaeration if there is a need to comply with prescribed dissolved oxygen requirements. If there is no need for reaeration, the capacity of basin 34 can be used as an additional anoxic volume.

If there is a nitrate deficiency in the system, the ORP probes will recognize that there is an excessive rate of nitrate drop, and the nitrate recycling from reactor 18 may be increased and/or the amount of return sludge may be adjusted. If the drop in the amount of nitrate is below the desired rate, the nitrate recycle rate through line 24 may be reduced and/or more activated sludge may be returned to reactor 12. The rate of nitrate use in reactor 26 may be controlled by controlling the substrate addition at 30 and/or adjusting the return sludge flow on line 50.

Under aerobic conditions, the ORP value sensed using a probe having a platinum sensing tip with a silver-silver chloride reference system at pH values between 6.0 and 8.5 can range between 100 mV and 150 mV on the low end and between 200 mV and 280 mV on the high end. The ORP value is dependent primarily on dissolved oxygen which is usually present in amounts less than 1.0 mg/liter.

As the system becomes anoxic, the ORP level stabilizes somewhere in the range of 50 mV to 150 mV. This range is maintained until the system is devoid of nitrate, at which time the ORP level becomes negative. This occurs at point C in FIG. 2. Depending on the overall conditions of the system, the ORP can drop to levels as low as −200 mV to −400 mV, indicating an anaerobic system.

Figure 3:
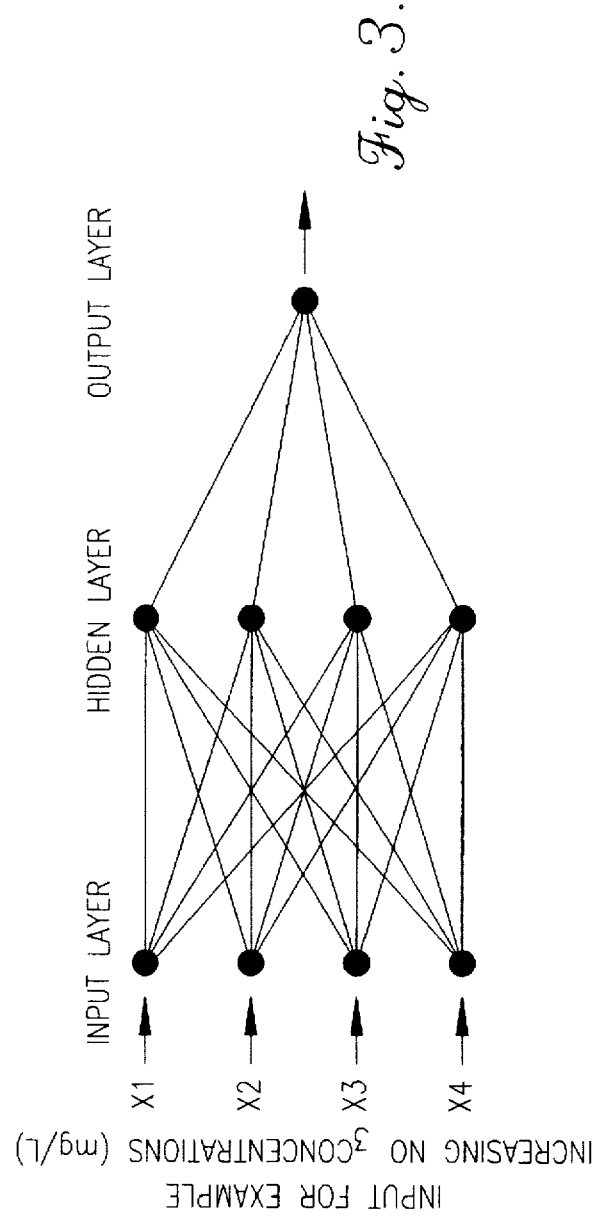
FIG. 3 is a diagrammatic view of a neural-network system used for control purposes in accordance with the present invention.

The control system makes use of a neural-network which is shown diagrammatically in FIG. 3. The neural-network is crudely trained or tuned using data acquired from other installations to establish a key informational baseline. The control system software may include a neuro-adaptive process control algorithm which effects real time updating of the neural-network weights to allow the tracking of slowly time-varying plant characteristics. The software extends this technique and provides a discrete-time adaptive identification algorithm which updates the input-output neural-network model with an adaptation performance 30–100 times faster than with other approaches to handling problems such as system non-linearity.

Features of this neural-network control technique include non-linear capability, adaptation, flexibility in the control objectives, constraints on control action, and multi-variable capability. The likelihood of correct control actions within proper time frames is maximized.

As soon as the system begins using nitrate (at point B in FIG. 2), the slope of the curve changes suddenly and is recognized as a point of inflection by the ORP probes. As nitrate is used, the ORP level decreases at an identifiable rate. The slope of the curve is relatively constant and the ORP probes recognize this as a zone of nitrate use. When the nitrate concentration reaches zero, the neuro-adaptive process control system recognizes this condition as occurring at the inflection point C. The abrupt change in the slope of the curve is used to control the nitrate addition to the denitrification reactor.

The system is useful to differentiate between the demands of the anoxic system in reactor 12 at the head of the plant and those of the internal anoxic system in reactor 26 used to remove residual nitrate. The system can recognize conditions that are outside of those intended and expected, such as cessation of nitrification or denitrification, and recognition of and response to industrial or shock loading can be made, as this causes dramatic change in the ORP values sensed by the probes.

As previously indicated, reactor 12 may be subdivided as desired. The internal recycle line 24 and the return sludge line 48 may connect with any or all of the sub-reactors, as may the influent line 10 which delivers incoming waste.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, we claim:

1. A system for biologically treating water/wastewater, comprising:

a first biological reactor for receiving influent water/wastewater, said first reactor being maintained in an anoxic state to effect denitrification of nitrate content delivered to it;

a second biological reactor for receiving effluent from said first reactor, said second reactor being maintained in an aerated state to effect BOD oxidation and nitrification of ammonia content delivered to it;

a third biological reactor downstream from said second reactor and receiving part of the discharge from the second reactor, said third reactor being maintained in an anoxic state to effect denitrification of residual nitrate delivered to it from the second reactor;

means for recycling to said first reactor the part of the discharge from the second reactor not directed to the third reactor;

a clarifier downstream from said third reactor for receiving and clarifying the liquid treated in said first, second and third reactors;

an activated sludge return line for returning activated sludge from the clarifier to the first basin;

means for sensing the oxidation potential at the inlet to and outlet from each of said reactors;

means for adjusting the amount of liquid recycled from said second reactor to said first reactor when the oxidation potentials sensed by said sensing means satisfy predetermined criteria; and means for adjusting the amount of activated sludge returned through said return line when the oxidation potentials sensed by said sensing means satisfy preselected criteria.

2. The system of claim 1, wherein said means for adjusting the amount of liquid recycled and said means for adjusting the amount of activated sludge returned comprises neuro-adaptive means.

3. The system of claim 1, including means for aerating the water/wastewater between said third reactor and said clarifier.

4. The system of claim 1, including means for adding an auxiliary substrate to said third reactor in amounts dependent on said sensing means.

5. The system of claim 1, including means for directing activated sludge from said clarifier to said third reactor.

6. A system for biologically treating water/wastewater, comprising:

a first biological reactor for receiving influent water/wastewater, said first reactor having at least first and second sub-reactors therein, said first sub-reactor being maintained in an anoxic state for denitrification of nitrate content delivered to it and said second sub-reactor being maintained in an anaerobic state for release of phosphorus content delivered to it;

a second biological reactor for receiving effluent from said first reactor, said second reactor being maintained in an aerated state to effect oxidation of BOD and nitrification of ammonia content delivered to it and luxury uptake of the phosphorus content delivered to it;

a third biological reactor downstream from said second reactor and receiving part of the discharge from the second reactor, said third reactor being maintained in an anoxic state to effect denitrification of residual nitrate delivered to it from the second reactor;

means for recycling to said first reactor the part of the discharge from the second reactor not directed to the third reactor;

a clarifier downstream from said third reactor for receiving and clarifying the liquid treated in said first, second and third reactors;

an activated sludge return line for returning activated sludge from the clarifier to the first basin;

means for sensing the oxidation potential at the inlet to and outlet from each reactor;

means for adjusting the amount of liquid recycled from said second reactor to said first reactor when the oxidation potentials sensed by said sensing means satisfy predetermined criteria; and means for adjusting the amount of activated sludge returned through said return line when the oxidation potentials sensed by said sensing means satisfy preselected criteria.

7. The system of claim 6, wherein said means for adjusting the amount of liquid recycled and said means for adjusting the amount of activated sludge returned comprises neuro-adaptive means.

8. The system of claim 6, including means for aerating the water/wastewater between said third reactor and said clarifier.

9. The system of claim 6, including means for adding an auxiliary substrate to said third reactor in amounts dependent on said sensing means.

10. The system of claim 6, including means for directing activated sludge from said clarifier to said third reactor.

11. A biological water/wastewater treatment system having a first mode of operation for biological phosphorus removal and a second mode of operation not removing phosphorus, said system comprising:

a first biological reactor for receiving the water/wastewater influent, said first reactor being maintained in an anaerobic state in the first mode of operation and an anoxic state in the second mode of operation;

a second biological reactor for receiving the effluent from the first reactor, said second reactor being maintained in an aerated state for nitrifying ammonia and for luxury uptake of phosphorus in the first mode of operation;

means for recycling to said first reactor an adjustable amount of the liquid discharged from the second reactor;

a third biological reactor for receiving the remainder of the liquid discharged from the second reactor, said third reactor being maintained in an anoxic state for denitrifying residual nitrates;

a clarifier for receiving and clarifying the water/wastewater;

an activated sludge return line for returning activated sludge from the clarifier to the first basin;

means for sensing the oxidation potential at the inlet to and outlet from each of said reactors;

means for adjusting the amount of liquid recycled from said second reactor to said first reactor when the oxidation potentials sensed by said sensing means satisfy predetermined criteria; and means for adjusting the amount of activated sludge returned through said return line when the oxidation potentials sensed by said sensing means satisfy preselected criteria.

12. The system of claim 11, wherein said means for adjusting the amount of liquid recycled and said means for adjusting the amount of activated sludge returned comprises neuro-adaptive means.

13. The system of claim 11, including means for reaerating the water/wastewater between said third reactor and said clarifier.

14. The system of claim 11, including means for adding an auxiliary substrate to said third reactor in amounts dependent on said sensing means.

15. The system of claim 11, including means for directing activated sludge from said clarifier to said third reactor.

16. A process for controlling the biological treatment of water/wastewater, comprising:

denitrifying nitrates in a first biological reactor maintained in either an anoxic state or anaerobic state;

directing the water/wastewater from the first reactor to a second biological reactor maintained in an aerated state for nitrification of ammonia;

recycling some of the nitrates from said second reactor to said first reactor;

directing the remaining residual nitrates from said second reactor to a third reactor maintained in an anoxic state to denitrify the residual nitrates;

clarifying the water/wastewater in a clarifier;

returning activated sludge from the clarifier to the first reactor;

sensing the oxidation potential at the inlet to and outlet from each reactor; and adjusting the amount of nitrates recycled to the first reactor and the amount of activated sludge returned to the first reactor in accordance with the oxidation potentials that are sensed.

17. A process as set forth in claim 16, wherein said adjusting step comprises using neuro-adaptic control techniques.

18. A process as set forth in claim 16, including the step of aerating the water/wastewater between the third reactor and clarifier.

19. A process as set forth in claim 16, including the step of adding an auxiliary substrate to said third reactor.

20. A process as set forth in claim 16, including the step of returning activated sludge from the clarifier to the third reactor.

* * * * *